（12） United States Patent
Amizur et al.

(10) Patent No.: US 9,380,471 B2
(45) Date of Patent: Jun. 28, 2016

(54) METHOD, APPARATUS AND SYSTEM OF DETERMINING A TIME OF ARRIVAL OF A WIRELESS COMMUNICATION SIGNAL

(75) Inventors: Yuval Amizur, Kfar-Saba (IL); Leor Banin, Petach Tikva (IL)

(73) Assignee: INTEL CORPORATION, Santa Clara, CA (US)

( * ) Notice: Subject to any disclaimer, the term of this patent is extended or adjusted under 35 U.S.C. 154(b) by 257 days.

(21) Appl. No.: 13/976,050

(22) PCT Filed: Apr. 19, 2012

(86) PCT No.: PCT/US2012/034263
§ 371 (c)(1),
(2), (4) Date: Jun. 26, 2013

(87) PCT Pub. No.: WO2013/070275
PCT Pub. Date: May 16, 2013

(65) Prior Publication Data
US 2013/0273935 A1 Oct. 17, 2013

Related U.S. Application Data

(60) Provisional application No. 61/556,891, filed on Nov. 8, 2011.

(51) Int. Cl.
*H04W 24/00* (2009.01)
*G01S 3/74* (2006.01)
*G01S 5/10* (2006.01)
*H04W 64/00* (2009.01)

(52) U.S. Cl.
CPC ............... *H04W 24/00* (2013.01); *G01S 3/74* (2013.01); *G01S 5/10* (2013.01); *H04W 64/00* (2013.01)

(58) Field of Classification Search
CPC .......... G01S 5/0215; G01S 5/10; G01S 3/74; G01S 19/22; H04W 24/00; H04W 64/00
USPC ............... 370/338, 342, 350; 455/101, 456.1; 375/E1.025, E1.032, 148, 346
See application file for complete search history.

(56) References Cited

U.S. PATENT DOCUMENTS

| 5,365,238 | A * | 11/1994 | Sullivan | 342/195 |
|---|---|---|---|---|
| 7,224,714 | B1 * | 5/2007 | Barman et al. | 375/140 |
| 2009/0046792 | A1 | 2/2009 | Xu et al. | |
| 2009/0058729 | A1 | 3/2009 | Jo | |
| 2010/0190509 | A1 * | 7/2010 | Davis | 455/456.1 |

(Continued)

OTHER PUBLICATIONS

Alsindi, Nayef Ali. "Performance of TOA Estimation Algorithms in Different Indoor Multipath Conditions." Master's Thesis. Worcester Polytechnic Institute, 2004.*

(Continued)

*Primary Examiner* — Vladimir Magloire
*Assistant Examiner* — Erica Navar
(74) *Attorney, Agent, or Firm* — Shichrur & Co.

(57) ABSTRACT

Some demonstrative embodiments include devices, systems and methods of determining a Time of Arrival (ToA) of a wireless communication signal. For example, a method may include receiving a signal over a wireless communication channel, detecting a symbol boundary of a symbol of the signal, and determining a ToA of the signal based on the symbol boundary and a channel estimation of the wireless communication channel.

25 Claims, 6 Drawing Sheets

(56) References Cited

U.S. PATENT DOCUMENTS

2010/0227560 A1     9/2010  Wu et al.
2010/0279707 A1*   11/2010  Fischer et al. ............. 455/456.1

OTHER PUBLICATIONS

International Preliminary Report on Patentability and Written Opinion for PCT Patent Application No. PCT/US2012/034263, mailed on May 22, 2014, 8 pages.

International Search Report and Written Opinion for PCT Patent Application No. PCT/US2012/034263, mailed on Jul. 27, 2012, 11 pages.

IEEE Std 802.11™—2007 (Revision of IEEE Std 802.11-1999) IEEE Standard for Information technology—Telecommunications and information exchange between systems—Local and metropolitan area networks—Specific requirements. Part 11: Wireless LAN Medium Access Control (MAC) and Physical Layer (PHY) Specifications.

IEEE P802.11v™/D7.0, Jul. 2009, Draft Standard for Information technology—Telecommunications and information exchange between systems—Local and metropolitan area networks—Specific requirements—Part 11: Wireless LAN Medium Access Control (MAC) and Physical Layer (PHY) Specifications—Amendment 8: Wireless Network Management.

* cited by examiner

METHOD, APPARATUS AND SYSTEM OF DETERMINING A TIME OF ARRIVAL OF A WIRELESS COMMUNICATION SIGNAL

CROSS REFERENCE

This application is a National Phase Application of PCT International Application No. PCT/US2012/034263, International Filing Date Apr. 19, 2012, which in turn claims the benefit of and priority from U.S. Provisional Patent application No. 61/556,891, entitled "Method, Apparatus and System For Measuring of Time of Arrival of Packets", filed Nov. 8, 2011, the entire disclosures of which are incorporated herein by reference.

BACKGROUND

In general, many of the positioning systems rely on timing measurements that may be used to calculate ranges. An example for such a system is a global positioning system (GPS).

*IEEE 802.11v standard for Information Technology—Telecommunications and information exchange between systems—Local and metropolitan area networks—Specific requirements Part* 11: *Wireless LAN Medium Access Control (MAC) and Physical Layer (PHY) specifications Amendment* 8: *IEEE 802.11 Wireless Network Management* ("the IEEE 802.11v standard"), defines a timing measurement that may be used for positioning of a device.

However, the accuracy of this measurement according to the IEEE 802.11v standard is not sufficient for indoor positioning and navigation, e.g., because a range measurement error is above 1 meter. For example, the IEEE 802.11v standard defines a maximum resolution of 10 nanoseconds, which is not sufficient for indoor positioning and/or indoor navigation.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
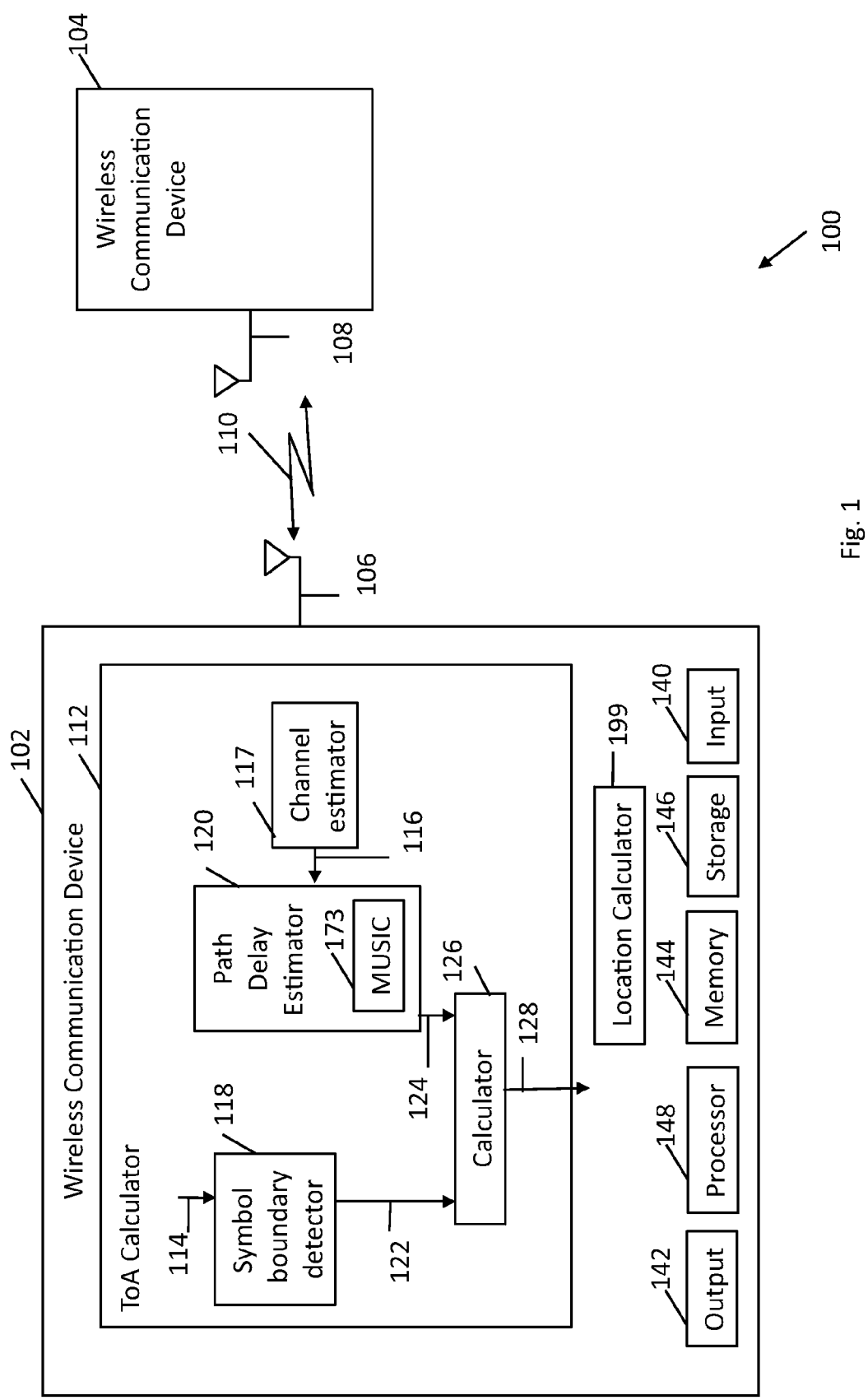
FIG. 1 is a schematic block diagram illustration of a system in accordance with some demonstrative embodiments.

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, or transmission devices. The terms "a" or "an", as used herein, are defined as one, or more than one. The term plurality, as used herein, is defined as two, or more than two. The term another, as used herein, is defined as, at least a second or more. The terms including and/or having, as used herein, are defined as, but not limited to, comprising. The term coupled as used herein, is defined as operably connected in any desired form for example, mechanically, electronically, digitally, directly, by software, by hardware and the like.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

The phrase "mobile device" as used herein includes any suitable portable, movable, transportable, non-stationary and/or non-fixed wireless device. The mobile device may include, for example, a mobile computer, a laptop computer, a notebook computer, a tablet computer, a handheld computer, a handheld device, a Personal Digital Assistant (PDA) device, a handheld PDA device, a hybrid device, a consumer device, a wireless communication device, a cellular device, a cellular telephone, a mobile internet device (MID), a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a wireless handheld device (e.g., BlackBerry, Palm Treo), a Wireless Application Protocol (WAP) device, and the like.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, WLAN stations, wireless personal network (WPAN), cellular networks, smartphone devices and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Area Network (WVAN), a Local Area Network (LAN), a WLAN, a PAN, a WPAN, devices and/or networks operating in accordance with existing WirelessHDTM and/or Wireless-Gigabit-Alliance (WGA) specifications and/or future versions and/or derivatives thereof, devices and/or networks operating in accordance with existing IEEE 802.11 (*IEEE 802.11-2007: Wireless LAN Medium Access Control (MAC) and Physical Layer (PHY) Specifications*) standards and amendments ("the IEEE 802.11 standards"), e.g., *IEEE 802.11v standard for Information Technology—Telecommunications and information exchange between systems—Local and metropolitan area networks—Specific requirements Part 11: Wireless LAN Medium Access Control (MAC) and Physical Layer (PHY) specifications Amendment 8: IEEE 802.11 Wireless Network Management* ("the IEEE 802.11v standard"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a device which incorporates an location base system such as for example GPS, element or chip, a device which incorporates a near field communication (NFC) element or chip, a device which operate under mobile phone operating systems (OS) such as, for example, iOS™, Android™, Windows® or the like, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, 5G, Enhanced Data rates for GSM Evolution (EDGE), or the like. Other embodiments may be used in various other devices, systems and/or networks.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, and the like.

Some demonstrative embodiments include a method including receiving a signal over a wireless communication channel; detecting a symbol boundary of a symbol of the signal; and determining a time of arrival (ToA) of the signal based on the symbol boundary and a channel estimation of the wireless communication channel.

In some demonstrative embodiments, the method may include determining a path delay corresponding to the wireless communication channel based on the channel estimation; and determining the ToA of the signal based on the symbol boundary and the path delay.

In some demonstrative embodiments, determining the path delay may include identifying a discrete phase vector (phasor) component of the channel estimation in a frequency domain; and determining the path delay according to a timing of the discrete phasor component.

In some demonstrative embodiments, identifying the discrete phasor component may include identifying a lowest phasor component of the channel estimation in the frequency domain.

In some demonstrative embodiments, the path delay may include a line-of-sight (LoS) path delay corresponding to a LoS path within the wireless communication channel.

In some demonstrative embodiments, the method may include identifying a lowest phasor component of the channel estimation in a frequency domain; and determining the LoS path delay according to a timing of the lowest phasor component.

In some demonstrative embodiments, determining the path delay may include performing an Eigen decomposition on a covariance matrix corresponding to the channel estimation.

In some demonstrative embodiments, determining the path delay may include applying a super-resolution frequency-estimation algorithm to convert the channel estimation from a frequency domain into a time domain.

In some demonstrative embodiments, the super-resolution frequency-estimation algorithm may include a Multiple-Signal-Classification (MUSIC) algorithm.

In some demonstrative embodiments, the method may include determining a time-of-flight (ToF) between a receiver of the signal and a transmitter of the signal based on the ToA of the signal.

In some demonstrative embodiments, the method may include determining a distance between the transmitter and receiver based on the ToF.

In some demonstrative embodiments, the method may include determining a location of a receiver of the signal based on the ToA of the signal.

In some demonstrative embodiments, detecting the symbol boundary may include detecting a ToA of the symbol.

In some demonstrative embodiments, the signal may include an Orthogonal-Frequency-Division-Multiplexing (OFDM) signal, and the symbol may include an OFDM symbol.

In some demonstrative embodiments, a wireless communication device may include ToA calculator to determine a path delay corresponding to a wireless communication channel, and to calculate a ToA of a signal received over the wireless communication channel based on the path delay and on a detected symbol boundary of a symbol of the signal.

In some demonstrative embodiments, a wireless communication system may include a wireless communication device to receive a first message from another wireless communication device over a wireless communication channel, to calculate a ToA of the first message based on a path delay corresponding to the wireless communication channel and on a detected symbol boundary of a symbol of the message, and to transmit to the other wireless communication device a second message including a value corresponding to the ToA.

Reference is now made to FIG. 1, which schematically illustrates a block diagram of a system 100 in accordance with some demonstrative embodiments.

As shown in FIG. 1, in some demonstrative embodiments, system 100 may include a wireless communication network including one or more wireless communication devices, e.g., wireless communication devices 102 and/or 104, capable of communicating content, data, information and/or signals over a wireless communication channel 110, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 104 include, for example, one or more wireless transmitters, receivers and/or transceivers able to send and/or receive wireless communication signals, RF signals, frames, blocks, transmission streams, packets, messages, data items, and/or data.

In some demonstrative embodiments, wireless communication devices 102 and/or 104 may include or may be implemented as part of a mobile or portable device. For example, wireless communication devices 102 and/or 104 may include or may be implemented as part a mobile computer, a laptop computer, a notebook computer, a tablet computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, system 100 may include an indoor-based system located within an indoor premises and/or location, e.g., a building, a shop, an office, a shopping center, a mall, and the like. In other embodiments, system 100 may include an outdoor system located outdoors and/or in a combination of one or more indoor locations, e.g., one or more buildings, and/or one or more outdoor locations. In one example, system 100 may be deployed within a shopping center or a campus.

Wireless communication devices 102 and/or 104 may include, for example, one or more of a processor 148, an input unit 140, an output unit 142, a memory unit 144, and a storage unit 146. Wireless communication devices 102 and/or 104 may optionally include other suitable hardware components and/or software components. In some demonstrative embodiments, some or all of the components of one or more of wireless communication devices 102 and/or 104 may be enclosed in a common housing or packaging, and may be interconnected or operably associated using one or more wired or wireless links. In other embodiments, components of one or more of wireless communication devices 102 and/or 104 may be distributed among multiple or separate devices.

Processor 148 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 148 executes instructions, for example, of an Operating System (OS) of wireless communication devices 102 and/or 104 and/or of one or more suitable applications.

Input unit 140 includes, for example, a keyboard, a keypad, a mouse, a touch-pad, a track-ball, a stylus, a microphone, or other suitable pointing device or input device. Output unit 142 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 144 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 146 includes, for example, a hard disk drive, a floppy disk drive, a Compact Disk (CD) drive, a CD-ROM drive, a DVD drive, or other suitable removable or non-removable storage units. Memory unit 144 and/or storage unit 146, for example, may store data processed by wireless communication devices 102 and/or 104.

In some demonstrative embodiments, wireless communication devices 102 and 104 may include, or may be associated with, one or more antennas 106 and 108, respectively. Antennas 106 and/or 108 may include any type of antennas suitable for transmitting and/or receiving wireless communication signals, blocks, frames, transmission streams, packets, messages and/or data, e.g., over channel 110. For example, antennas 106 and/or 108 may include any suitable configuration, structure and/or arrangement of one or more antenna elements, components, units, assemblies and/or arrays. Antennas 106 and/or 108 may include an antenna covered by a quasi-omni antenna pattern. For example, antennas 106 and/or 108 may include at least one of a phased array antenna, a single element antenna, a set of switched beam antennas, and the like. In some embodiments, antennas 106 and/or 108 may implement transmit and receive functionalities using separate transmit and receive antenna elements. In some embodiments, antennas 106 and/or 108 may implement transmit and receive functionalities using common and/or integrated transmit/receive elements.

In some demonstrative embodiments, device 102 may include a Time of Arrival (ToA) calculator to calculate a ToA 128 of a wireless communication signal 114 received from device 104, e.g., as described in detail below. For example, wireless communication signal may include an OFDM signal or any other signal.

In some demonstrative embodiments, device 102 may utilize ToA 128 to calculate, for example, a range, a distance, a location, and the like. For example, device 102 may calculate a location of device 102 and/or distance between devices 102 and 104 base on the calculated ToA, e.g., as described in detail below.

In some demonstrative embodiments, device 102 may include a location calculator 199 to calculate, for example, a range, a distance, and/or location of device 102 based on ToA 128, e.g., as described below.

In some demonstrative embodiments, a calculated ToA of the received signal 114 may have a relatively low level of accuracy, for example, if the ToA is determined, e.g., in an indoor environment, by measuring a time of arrival of a first sample of an OFDM symbol of signal 114, e.g., due to multipath interference. For example, using this measurement of the ToA may result in a relatively large positioning error, e.g., of about 50 meters or more. Accordingly, this measurement of the ToA may not be accurate, for example, for indoor positioning and/or navigation.

In some demonstrative embodiments, ToA calculator 112 may be capable of utilizing a ToA calculation, e.g., as described in detail below, which may result, for example, in ToA 128 having a relatively high degree of accuracy. For example, ToA 128 may have an error of less than 10 nanoseconds (ns), for example, an error of no more than 5 ns, for example, an error of 1 ns or less, e.g., an error of about 0.1 ns.

In some demonstrative embodiments, ToA calculator 112 may be configured to determine ToA 128 of wireless communication signal 114 received over channel 110 based on a detected symbol boundary of a symbol of signal 114 and a channel estimation 116 of wireless communication channel 110, e.g., as described in detail below.

In some demonstrative embodiments, device 102 may include a channel estimator 117 to generate channel estimation 116, for example, according to a channel estimation scheme, e.g., utilizing channel state information (CSI), and the like. Channel estimator 117 may be implemented as part of ToA calculator 112, or as a separate element of device 102.

In some demonstrative embodiments, ToA calculator 112 may determine ToA 128 of wireless communication signal 114 based on a detected symbol boundary of an OFDM symbol of signal 114 and channel estimation 116 of wireless communication channel 110, e.g., as described in detail below.

In some demonstrative embodiments, ToA calculator 112 may include a path delay estimator 120 to determine a path delay 124 corresponding to wireless communication channel 110, for example, based on channel estimation 116.

In some demonstrative embodiments, ToA calculator 112 may include a symbol boundary detector 118 to detect a symbol boundary 122 of a symbol, e.g., a first symbol or any other particular symbol, of received signal 114, e.g., as described in detail below.

In some demonstrative embodiments, ToA calculator 112 may include a calculator 126 to determine ToA 128 based on detected symbol boundary 122 and path delay 124, e.g., as described in detail below.

In some demonstrative embodiments, path delay 124 may include a path delay corresponding to a particular path of channel 110.

In some demonstrative embodiments, path delay 124 may include a path delay of a Line of Sight (Los) path of channel 110, e.g., as described below. In other embodiments, path delay 124 may include a path delay of any other particular path of channel 110.

In some demonstrative embodiments, it may be difficult to identify, detect and/or extract the path delay of the particular path. For example, it may be difficult to identify, detect and/or extract the LoS path delay, for example, if a LoS path is not the strongest path of received signal 114, or if there are one or more other paths relatively close to the LoS path.

In some demonstrative embodiments, ToA calculator 112 may utilize a duality between a time domain and frequency domain, for example, to extract a particular path delay component from channel estimation 116. For example, a path delay component in the time domain may be represented by a complex exponential in the frequency domain. Accordingly, ToA calculator 112 may extract the particular path delay component from channel estimation 116 by extracting signal complex exponentials from channel estimation 116, and identifying a particular component corresponding to the particular path delay, for example, identifying a component with a lowest frequency corresponding to a path having a lowest path delay, e.g., as described below.

In some demonstrative embodiments, ToA calculator 112 may determine the path delay 124 corresponding to wireless communication channel 110 by identifying a discrete phase-vector (phasor) component of channel estimation 116 in the frequency domain; and determining the path delay 124 according to a timing of the discrete phasor component.

The term "phasor" as used herein relates to a representation of time delay in the frequency domain. The phasor frequency in the frequency domain relates directly to the path delay and the amplitude relates to the path component strength or power.

In some demonstrative embodiments, path delay estimator 120 may map a path delay in a time domain of signal 114 into a phasor including a complex exponent in a frequency domain. The phasor frequency of the phasor in the frequency domain may be related to a value of the path delay. For example, a low phasor frequency may correspond to a short path delay.

In some demonstrative embodiments, path delay estimator 120 may determine path delay 124 by applying a super-resolution frequency-estimation algorithm to convert channel estimation 116 from a frequency domain into a time domain, e.g., with a finer resolution level, e.g., as described in detail below.

In some demonstrative embodiments, the super-resolution frequency-estimation algorithm may include, for example, performing an Eigen decomposition on a covariance matrix corresponding to channel estimation 116.

For example, path delay estimator may apply a Multiple-Signal-Classification (MUSIC) algorithm 173 to convert channel estimation 116 from the frequency domain to the time domain. In other embodiments, the super-resolution frequency-estimation algorithm may include any other algorithm and/or method.

In some demonstrative embodiments, MUSIC algorithm 173 may be used for extracting the LoS component timing, for example, in a sub sample resolution, e.g., as described below with reference to FIG. 3.

In some demonstrative embodiments, MUSIC algorithm 173 may estimate a frequency content of channel estimation 116, for example, by performing an eigen decomposition on a covariance matrix corresponding to channel estimation 116. For example, MUSIC algorithm 173 may assume that a signal, denoted x(n), representing channel estimation 116 includes a number, denoted p, of complex exponentials in the presence of Gaussian white noise. For example, given an M×M autocorrelation matrix, denoted Rx, if the eigenvalues are sorted in decreasing order, the eigenvectors corresponding to the p largest eigenvalues span the signal subspace of the signal x(n).

In some demonstrative embodiment, a MUSIC spectrum, denoted $P_{MU}$, corresponding to channel estimation 116 may be determined by applying MUSIC algorithm 173 to channel estimation 116. For example, the MUSIC spectrum $P_{MU}$ may be determined, e.g., as follows:

$$\hat{P}_{MU}(e^{j\omega}) = \frac{1}{\sum_{i=p+1}^{M} |e^H v_i|^2}, \quad (1)$$

wherein $v_i$ denotes an i-th noise eigenvector, and wherein:

$$e = [1\, e^{j\omega} e^{j2\omega} \ldots e^{j(M-1)\omega}]^T. \quad (2)$$

In some demonstrative embodiments, path delay estimator 120 may identify a lowest frequency phasor corresponding to channel estimation 116 in the time domain, e.g., as described below. In other embodiments, path delay estimator 120 may identify another frequency phasor, e.g., a second-lowest frequency phasor component, corresponding to channel estimation 116 in the time domain.

In some demonstrative embodiments, path delay estimator 120 may generate path delay 124 including a time delay, denoted Δt, of the path corresponding to the identified phasor. For example, path delay estimator 120 may generate path delay 124 including the time delay Δt of a path ("the lowest-delay path") corresponding to the lowest frequency phasor.

In some demonstrative embodiments, the lowest-delay path may correspond to the LoS path within the wireless communication channel 110. For example, path delay estimator 120 may apply the super-resolution frequency-estimation algorithm, e.g., MUSIC algorithm 173, to channel estimation 116 in the frequency domain. Path delay estimator 120 may analyze a resulting spectrum, e.g., a MUSIC spectrum, to detect and select a peak corresponding to the LoS Path.

Figure 3:
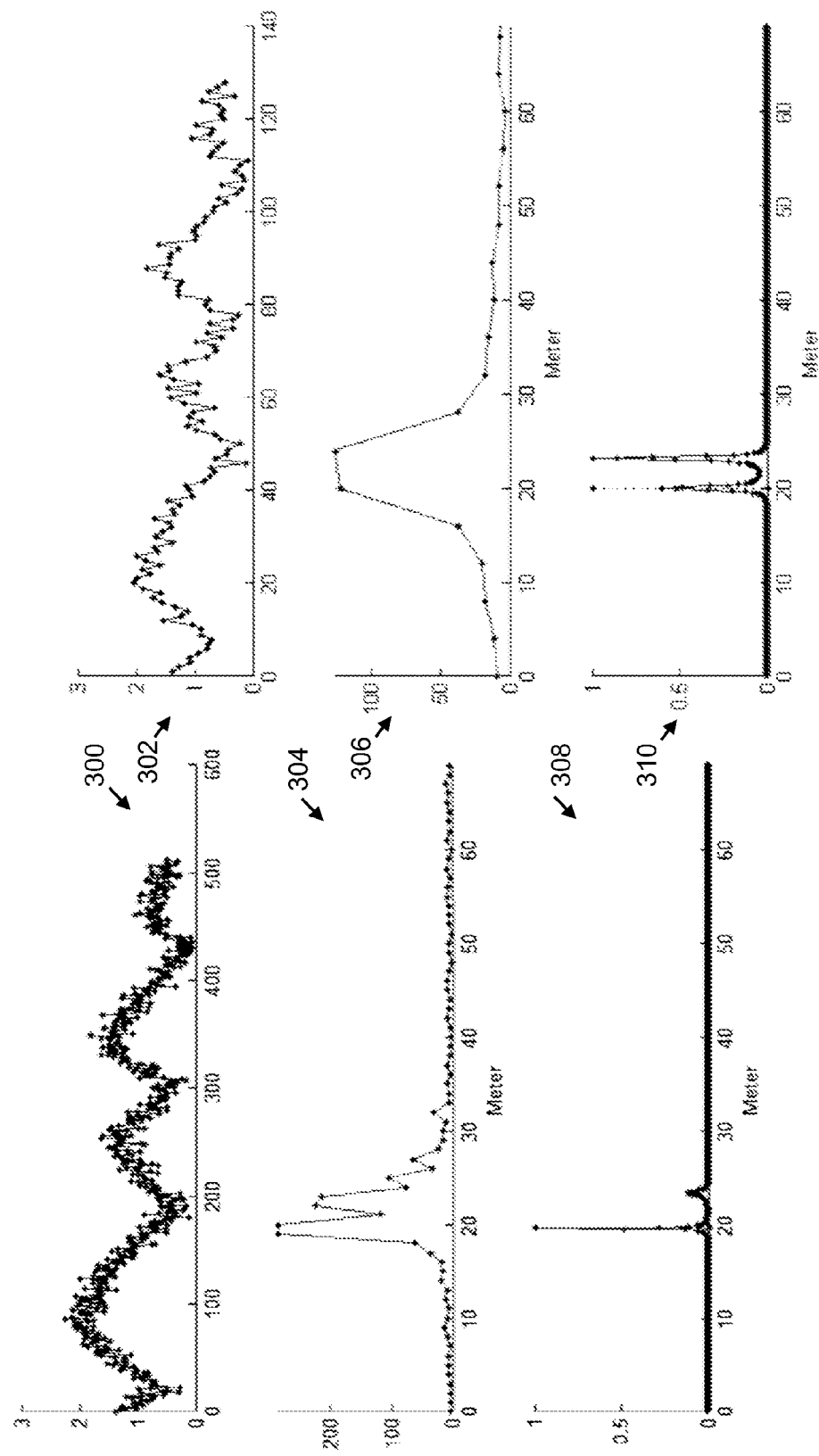
FIG. 3 is a schematic illustration of two graphs depicting channel estimations sampled at first and second sampling rates in a frequency domain, two graphs depicting the channel impulse response of the channel estimation sampled at the first and second sampling rates, and two graphs depicting Multiple-Signal-Classification (MUSIC) spectrums corresponding to the channel estimation sampled at the first and second sampling rates.

Reference is made to FIG. 3, which schematically illustrates a graph 300 depicting a channel estimation sampled at a first sampling rate of 160 Mega Hertz (MHz) in the frequency domain, a graph 302 depicting the same channel estimation sampled at a second sampling rate of 40 MHz in the frequency domain, a graph 304 depicting a channel impulse response of the same channel estimation sampled at the first sampling rate of 160 MHz in the time domain, a graph 306 depicting the channel impulse response of the same channel estimation sampled at the second sampling rate of 40 MHz in the time domain, a graph 308 depicting a MUSIC spectrum corresponding to the same channel estimation sampled at the first sampling rate of 160 MHz, and a graph 310 depicting the MUSIC spectrum corresponding to the same channel estimation sampled at the second sampling rate of 40 MHz. For example, the MUSIC spectrums of graph 308 and 310 may be generated by applying MUSIC algorithm 173 (FIG. 1) to channel estimation 116 (FIG. 1).

A shown in FIG. 3, it may be difficult to detect and/or identify one or more paths from the channel estimation of in the frequency domain and/or from the channel impulse response of the same channel estimation, for example, if the channel estimation is sampled at a relatively low rate and/or if the wireless communication channel has a relatively narrow bandwidth. For example, it may be difficult to detect and/or identify one or more paths based on graphs 302 and 306.

As also shown in FIG. 3, one or more paths may be detected and/or estimated from the MUSIC spectrum of graphs 308 and 310, e.g., even if the channel estimation is sampled at a relatively low rate and/or if the wireless communication channel has a relatively narrow bandwidth. For example, one or more paths may be detected and/or estimated based on graph 310

Referring back to FIG. 1, in some demonstrative embodiments, path delay estimator 120 may detect the particular path delay based on the MUSIC spectrum, e.g., based on the MUSIC spectrums of graphs 308 and/or 310 (FIG. 1). For example, path delay estimator 120 may determine a derivative of the MUSIC spectrum to determine positions of one or more local maximums of the MUSIC spectrum, and detect the particular path delay by detecting a corresponding local maximum. For example, path delay estimator 120 may detect the lowest delay path be detecting a first local maximum in the derivative of the MUSIC spectrum, e.g., by detecting a farthest left peak of the MUSIC spectrums of graphs 308 and/or 306 (FIG. 1).

In some demonstrative embodiments, path delay estimator 120 may utilize any noise handling, false-peak removal algorithm, filtering algorithm, and the like, to handle and/or remove any noise affecting the MUSIC spectrum.

Although some demonstrative embodiments are described above with reference to determining the path delay based on an identified phasor, in other embodiments the path delay may be determined by analyzing channel estimation 116 in time domain. For a super-resolution algorithm may be applied to the channel estimation 116 in time domain, for example, a blind signal separation (BSS) algorithm, e.g., an Independent component analysis (ICA), and the like.

In some demonstrative embodiments, symbol boundary detector 118 may generate symbol boundary 122 including a symbol boundary time, denoted $t_{symbStart}$, of a sample, e.g., the first sample, of a symbol, e.g., an OFDM symbol, of signal 114. In some embodiments, symbol boundary 122 may relate to a first OFDM symbol of signal 114, e.g., as described herein. In other embodiments, symbol boundary 122 may relate to any other particular symbol of signal 114.

In some demonstrative embodiments, calculator 126 may determine ToA 128 based on a combination of symbol boundary 122 and path delay 124.

In some demonstrative embodiments, calculator 126 may determine ToA 128 while considering a predefined delay, denoted, $t_{HW\text{-}delay}$, associated with one or more components of device 102. For example, the delay $t_{HW\text{-}delay}$ may include a delay, e.g., a fixed delay, resulting from one or more hardware and/or software components of device 102.

In one example, the delay $t_{HW\text{-}delay}$ may include a delay caused by antenna 106, and/or analog and/or digital circuitry of device 102, which may be used to process signal 114. The delay $t_{HW\text{-}delay}$ may be determined, for example, based on measurements.

In some demonstrative embodiments, calculator 126 may determine ToA 128, denoted $t_{ToA}$, based on a combination of the time $t_{symbStart}$, the time delay $\Delta t$ and the delay $t_{HW\text{-}delay}$, e.g., as follows:

$$t_{ToA} = t_{symbStart} + \Delta t - t_{HW\text{-}delay} \quad (3)$$

In some demonstrative embodiments, the calculation of the ToA, e.g., according to Equation 3, may yield ToA 128 having a relatively high degree of accuracy. For example, ToA 128 may have an error of 10 nanoseconds (ns) or less. For example, ToA calculator 112 may calculate ToA 128 at a resolution of no more than 5 ns, for example, 1 ns or less, e.g., about 0.1 ns.

Figure 2:
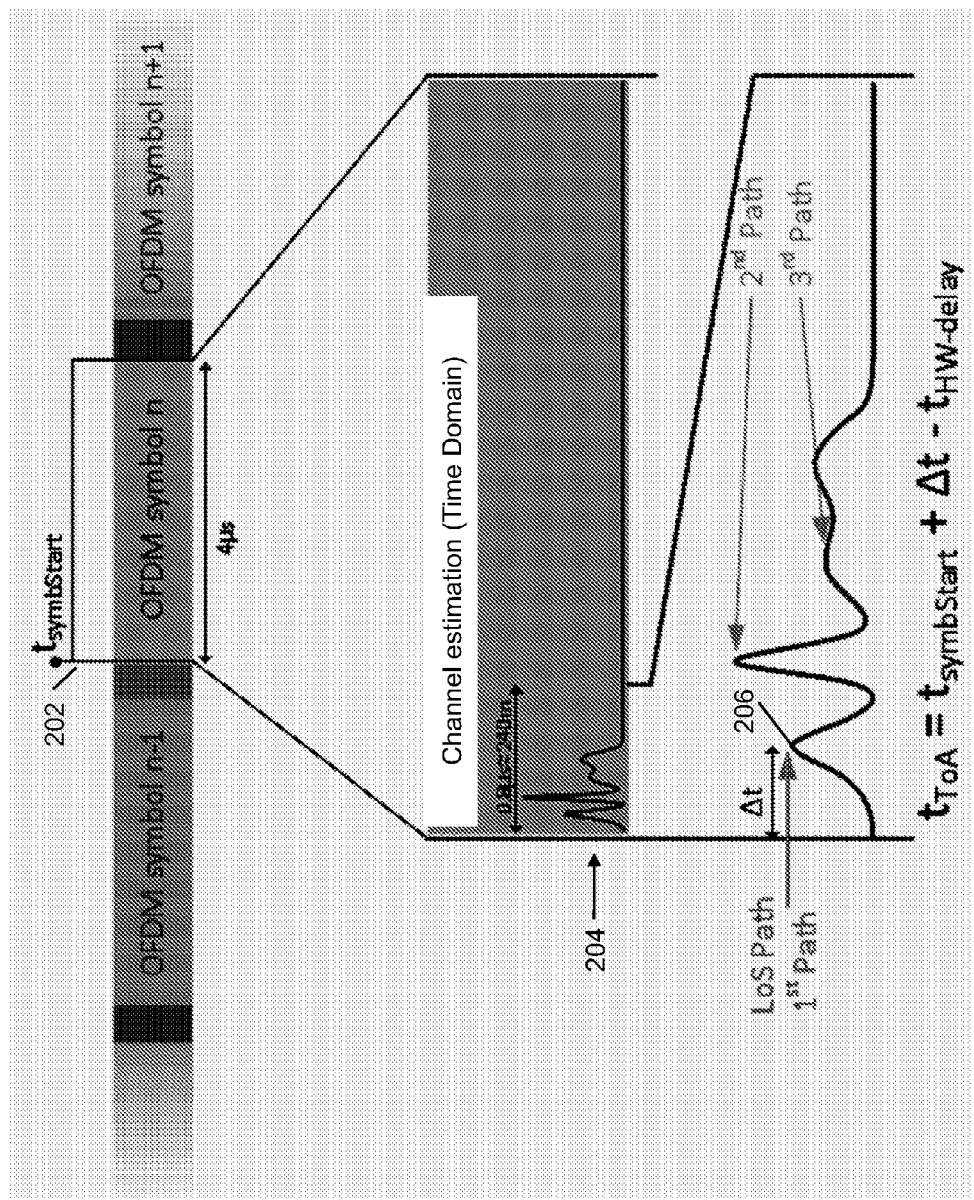
FIG. 2 is a schematic illustration of time components utilized for determining a Time of Arrival (ToA), in accordance with some demonstrative embodiments.

FIG. 2 schematically illustrates the time components utilized for determining the ToA $t_{ToA}$ according to Equation 3, in accordance with some demonstrative embodiments.

In some demonstrative embodiments, location calculator 199 may determine a location of device 102 based on ToA 128, e.g., as described below.

In some demonstrative embodiments, location calculator 199 may determine a time-of-flight (ToF) between device 102 and a transmitter of signal 114, e.g., device 104, based on ToA 128, e.g., as described in detail below. The ToF between device 102 and device 104 may include a time required for a signal, e.g., signal 114, to travel from device 104 to device 102.

Figure 4:
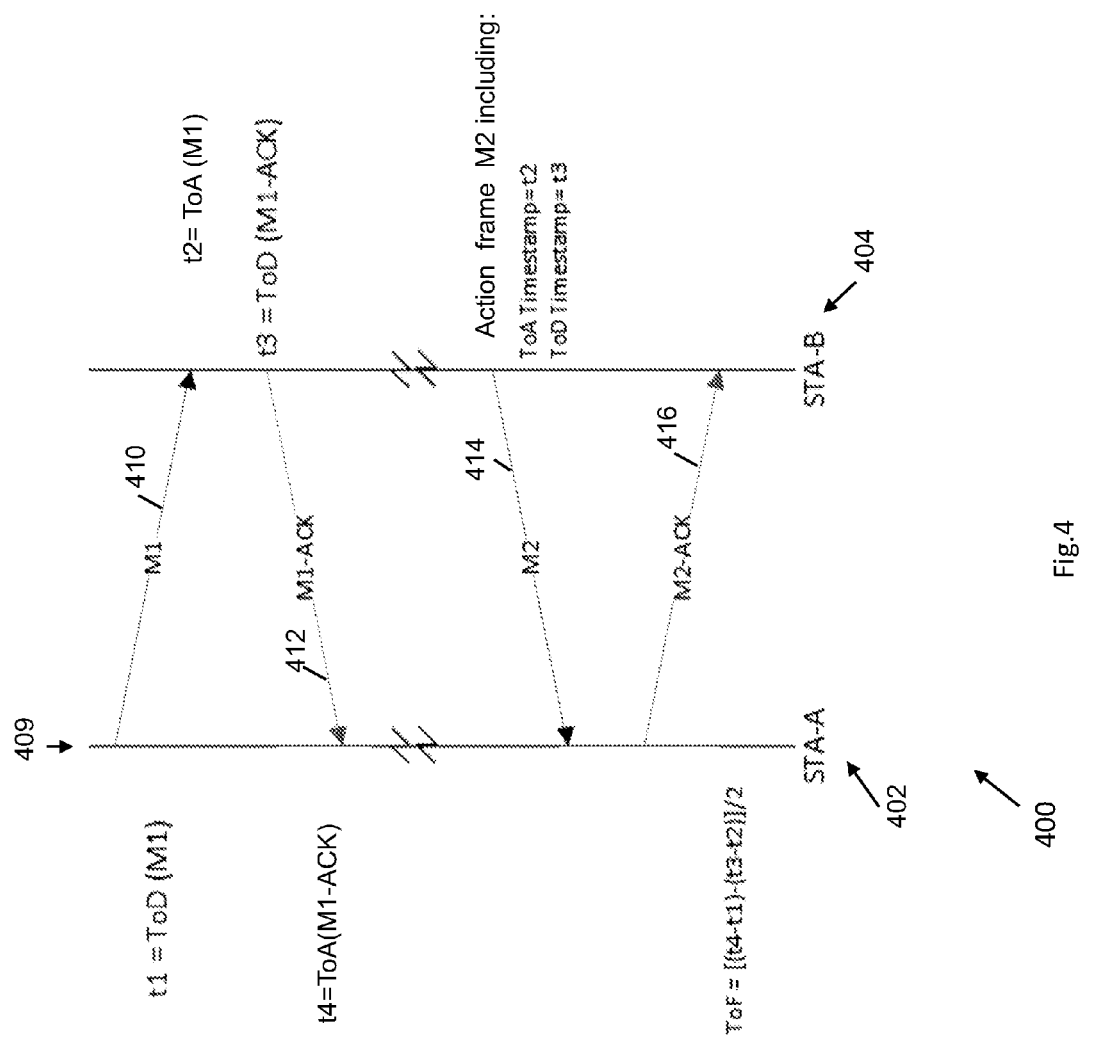
FIG. 4 is a schematic illustration of a sequence diagram, which demonstrates operations and interactions between a first device and a second device, in accordance with some demonstrative embodiments.

Reference is made to FIG. 4, which schematically illustrates a sequence diagram 400, which demonstrates operations and interactions between a first device 402, e.g., device 102 (FIG. 1), and a second device, e.g., device 104 (FIG. 1), along a timeline 409, in accordance with some demonstrative embodiments. In one example, device 402 may include a mobile station and device 404 may include an AP.

In some demonstrative embodiments, one or more of the operations of sequence 400 may be performed by devices 402 and/or 404 in order to determine at least one location-related parameter, e.g., a relative location ("range") between devices 402 and 404.

In some demonstrative embodiments, device 402 may transmit a message 410, denoted M1, to device 404, at a time, denoted t1. The time t1 may be a Time of Departure (ToD), denoted ToD(M1), of the message M1.

In some demonstrative embodiments, device 404 may receive message 410 and determine a time, denoted t2, e.g., by determining a ToA, denoted ToA(M1), of message 410. For example, device 404 may determine the time t2 according to Equation 3, e.g., as described above.

In some demonstrative embodiments, device 404 may transmit a message 412, denoted M1-ACK, to device 402, at a time, denoted t3. Message 412 may include, for example, an acknowledgement message transmitted in response to message 410. The time t3 may be a ToD, denoted ToD(M1-ACK), of the message M1-ACK.

In some demonstrative embodiments, device 402 may receive message 412 and determine a time, denoted t4, e.g., by determining a ToA, denoted ToA(M1-ACK), of message 412. For example, device 402 may determine the time t4 according to Equation 3, e.g., as described above.

In some demonstrative embodiments, device 404 may transmit a message 414, denoted M2, to device 402. Message 414 may include, for example, information corresponding to the time t2 and/or the time t3. For example, message 414 may include a timestamp, e.g., a ToA timestamp, including the time t2, and a timestamp, e.g., a ToD timestamp, including the time t3.

In some demonstrative embodiments, device 402 may receive message 414. Device 402 may determine a ToF between devices 402 and 404, for example, based on message 414.

For example, device 402 may determine the ToF based on an average, or any other function, applied to the time values t1, t2, t3 and t4. For example, device 402 may determine the ToF, e.g., as follows:

$$\text{ToF} = [(t4 - t1) - (t3 - t2)]/2 \quad (4)$$

In some demonstrative embodiments, device 402 may transmit a message 416, denoted M2-ACK, to device 404. Message 416 may include, for example, an acknowledgement message transmitted in response to message 414.

In some demonstrative embodiments, device 402 may determine the range between devices 402 and 404 based on the calculated ToF.

For example, device 402 may determine the range, denoted $r_k$, e.g., as follows:

$$r_k = \text{ToF} * C \quad (5)$$

wherein C denotes the radio wave propagation speed.

In some demonstrative embodiments, device 402 may determine a location of device 402, e.g., an absolute location of device 402, based on the estimated range $r_k$.

For example, device 402 may include location calculator 199 (FIG. 1) to determine two or more ToF values, e.g., according to Equation 5, with respect to two or more respective devices 404. Location calculator 199 (FIG. 1) may determine the location of device 402 based on the two or more ToF values, e.g., by trilateration.

As discussed above, the ToA my have a relatively high degree of accuracy. For example, ToA 128 (FIG. 1) may have an error of 10 nanoseconds (ns) or less. Accordingly, the ToA timestamp f message 414 may have a resolution of no more than 5 ns, for example, 1 ns or less, e.g., about 0.1 ns. As a result, device 402 may be capable of determining the range $r_k$ with a relatively high degree of accuracy, for example, an accuracy of 1 meter (m) or less, e.g., an accuracy of 0.3 m or less if a resolution of 1 ns is used, or even an accuracy of 0.03 m or less if a resolution of 0.1 ns is used.

Figure 5:
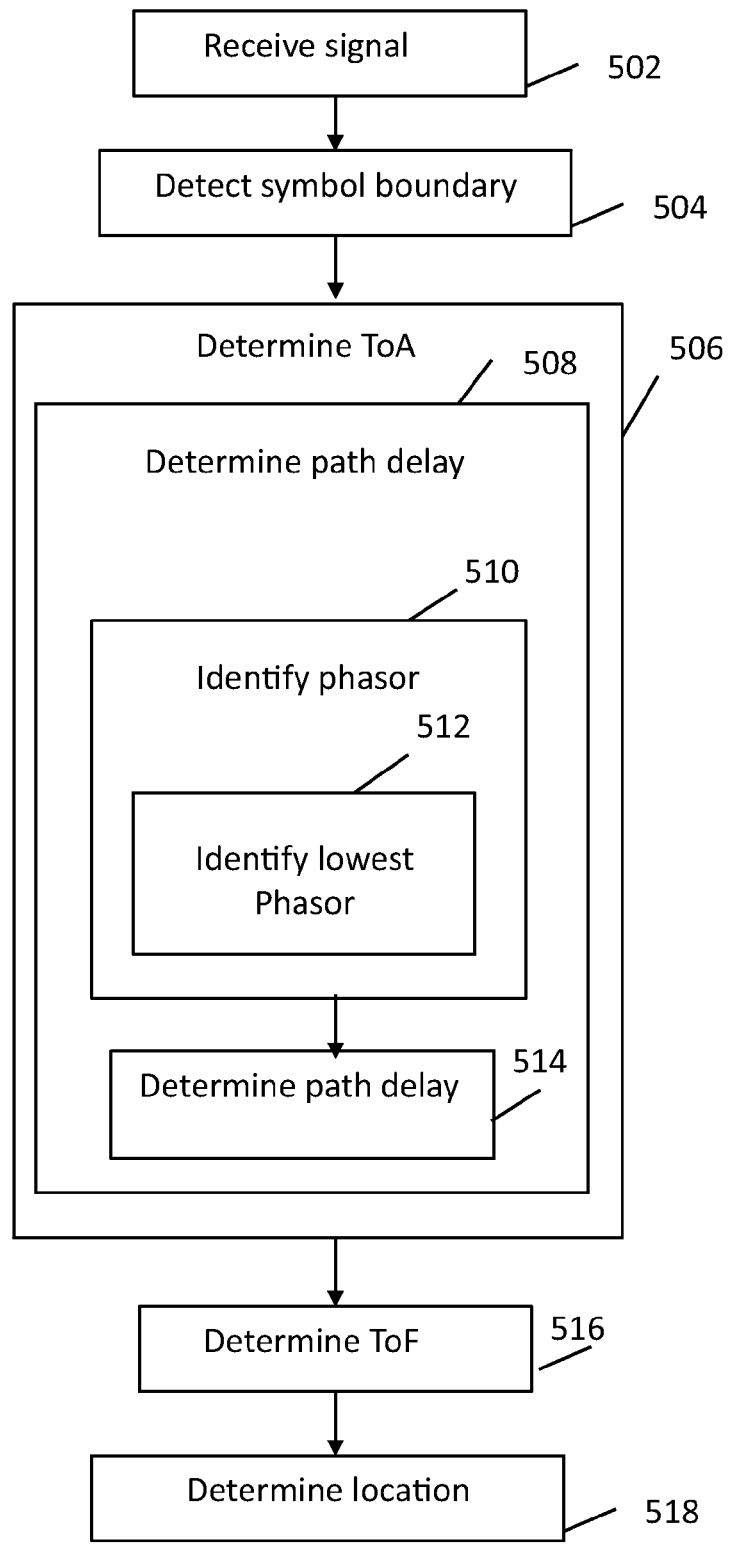
FIG. 5 is a schematic illustration of a method of determining a ToA of a wireless communication signal, in accordance with some demonstrative embodiments.

Reference is made to FIG. 5, which schematically illustrates a method of determining a ToA of a wireless communication signal, in accordance with some demonstrative embodiments. In some embodiments, one or more of the operations of the method of FIG. 5 may be performed by any suitable wireless communication system, e.g., system 100 (FIG. 1), wireless communication device, e.g., device 102 and/or device 104 (FIG. 1), and/or ToA calculator, e.g., ToA calculator 112 (FIG. 1).

As indicated at block 502, the method may include receiving a signal over a wireless communication channel. For example, device 102 (FIG. 1) may receive signal 114 (FIG. 1), e.g., as described above.

As indicated at block 504, the method may include detecting a symbol boundary of a symbol of the received signal. For example, symbol boundary detector 118 (FIG. 1) may detect symbol boundary 122 (FIG. 1), e.g., as described above.

As indicated at block 506, the method may include determining the ToA of the received signal based on the symbol boundary and a channel estimation of the wireless communication channel. For example, ToA calculator 112 (FIG. 1) may determine ToA 128 (FIG. 1), e.g., as described above.

As indicated at block 508, determining the ToA of the received signal may include determining a path delay corresponding to the wireless communication channel based on the channel estimation, and determining the ToA of the received signal based on the symbol boundary and the path delay. For example, path delay estimator 120 (FIG. 1) may determine path delay 124 (FIG. 1), and calculator 126 (FIG. 1) may determine ToA 128 (FIG. 1) based on symbol boundary 122 (FIG. 1) and path delay 124 (FIG. 1), e.g., as described above.

As indicated at block 510, determining the path delay may include identifying a discrete phase vector (phasor) component of the channel estimation in a frequency domain.

As indicated at block 512, identifying the discrete phasor component may include identifying a lowest phasor component of the channel estimation in the frequency domain. For example, the path delay may include a LoS path delay corresponding to the wireless communication channel, e.g., as described above.

In some demonstrative embodiments, determining the path delay may include performing an Eigen decomposition on a covariance matrix corresponding to the channel estimation, e.g., as descried above.

In some demonstrative embodiments, determining the path delay may include applying a super-resolution frequency-estimation algorithm, e.g., a MUSIC algorithm, to convert the channel estimation from a frequency domain into a time domain. For example, path delay estimator 120 (FIG. 1) may apply MUSIC algorithm 173 (FIG. 1), e.g., as described above.

As indicated at block 514, determining the path delay may include determining the path delay according to a timing of the discrete phasor component. path delay estimator 120 (FIG. 1) may determine path delay 124 (FIG. 1) based on the timing of the LoS component, e.g., as described above.

As indicated at block 516, the method may include determining a ToF between a receiver of the received signal and a transmitter of the received signal based on the ToA. For example, location calculator 199 (FIG. 1) may determine the ToF based on ToA 128 (FIG. 1), e.g., as described above.

As indicated at block 516, the method may include determining a location of the receiver of the signal based on the ToA. For example, location calculator 199 (FIG. 1) may determine a location of device 102 (FIG. 1) based on the ToF, e.g., as described above.

Figure 6:
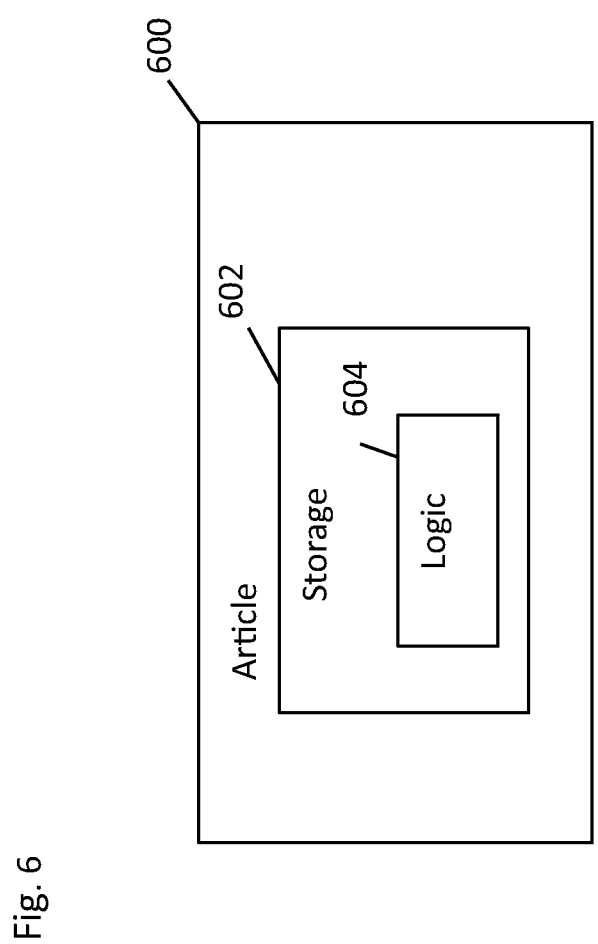
FIG. 6 is a schematic illustration of an article of manufacture, in accordance with some demonstrative embodiments.

Reference is made to FIG. 6, which schematically illustrates an article of manufacture 600, in accordance with some demonstrative embodiments. Article 600 may include a non-transitory machine-readable storage medium 602 to store logic 604, which may be used, for example, to perform at least part of the functionality of ToA calculator 112 (FIG. 1), location calculator 199 (FIG. 1) and/or to perform one or more operations of the method of FIG. 5. The phrase "non-transitory machine-readable medium" is directed to include all computer-readable media, with the sole exception being a transitory propagating signal.

In some demonstrative embodiments, article 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
   receiving a signal over a wireless communication channel;
   detecting a symbol boundary of a symbol of said signal; and
   determining a time of arrival (ToA) of said signal based on said symbol boundary and a channel estimation of said wireless communication channel, wherein determining said ToA comprises:
   identifying a discrete phase vector (phasor) component of said channel estimation in a frequency domain;
   determining a path delay corresponding to said wireless communication channel according to a timing of said discrete phasor component; and determining said ToA of said signal based on said symbol boundary and said path delay.

2. The method of claim 1 comprising: determining a time-of-flight (ToF) between a receiver of said signal and a transmitter of said signal based on the ToA of said signal.

3. The method of claim 1, wherein identifying said discrete phasor component comprises identifying a lowest phasor component of said channel estimation in said frequency domain.

4. The method of claim 1, wherein said path delay comprises a line-of-sight (LoS) path delay corresponding to a LoS path within said wireless communication channel.

5. A method comprising:
receiving a signal over a wireless communication channel;
detecting a symbol boundary of a symbol of said signal;
determining a time of arrival (ToA) of said signal based on said symbol boundary and a channel estimation of said wireless communication channel, wherein determining said ToA comprises:
identifying a lowest phasor component of said channel estimation in a frequency domain;
determining a line-of-sight (LoS) path delay corresponding to a LoS path within said wireless communication channel according to a timing of said lowest phasor component; and
determining said ToA of said signal based on said symbol boundary and said LoS path delay.

6. The method of claim 1, wherein determining said path delay comprises performing an eigen decomposition on a covariance matrix corresponding to said channel estimation.

7. The method of claim 1, wherein determining said path delay comprises applying a super-resolution frequency-estimation algorithm to convert said channel estimation from a frequency domain into a time domain.

8. The method of claim 7, wherein said super-resolution frequency-estimation algorithm comprises a Multiple-Signal-Classification (MUSIC) algorithm.

9. The method of claim 5 comprising determining a time-of-flight (ToF) between a receiver of said signal and a transmitter of said signal based on the ToA of said signal.

10. The method of claim 1 comprising determining a location of a receiver of said signal based on the ToA of said signal.

11. The method of claim 1, wherein detecting said symbol boundary comprises detecting a ToA of said symbol.

12. The method of claim 1, wherein said signal comprises an Orthogonal-Frequency-Division-Multiplexing (OFDM) signal, and said symbol comprises an OFDM symbol.

13. A wireless communication device comprising:
a radio configured to communicate over a wireless communication channel; and
a time of arrival (ToA) calculator component configured to calculate a ToA of a signal received over said wireless communication channel based on a detected symbol boundary of a symbol of said signal and a channel estimation of said wireless communication channel, said ToA calculator component is configured to identity a discrete phase vector (phasor) component of said channel estimation in a frequency domain, to determine a path delay corresponding to said wireless communication channel according to a timing of said discrete phasor component, and to determine said ToA of said signal based on said symbol boundary and said path delay.

14. The wireless communication device of claim 13, wherein the ToA calculator component is configured to determine said path delay by performing an eigen decomposition on a covariance matrix corresponding to said channel estimation.

15. The wireless communication device of claim 13, wherein said ToA calculator component is configured to detect said symbol boundary by detecting a ToA of said symbol.

16. The wireless communication device of claim 13, wherein said path delay comprises a line-of-sight (LoS) path delay corresponding to a LoS path within said wireless communication channel.

17. The wireless communication device of claim 13, wherein said path delay estimator component is configured to determine said path delay by applying a super-resolution frequency-estimation algorithm to convert said channel estimation from a frequency domain into a time domain.

18. The wireless communication device of claim 13 comprising a location calculator component to determine one or more location-related values corresponding to a location of said wireless communication device based on the ToA of said signal.

19. A wireless communication system comprising:
a wireless communication device configured to receive a first message from another wireless communication device over a wireless communication channel, to calculate a time of arrival (ToA) of said first message based on a detected symbol boundary of a symbol of said first message and a channel estimation of said wireless communication channel, and to transmit to the another wireless communication device a second message including a value corresponding to said ToA, said wireless communication device is configured to identify a discrete phase vector (phasor) component of said channel estimation in a frequency domain, to determine a path delay corresponding to said wireless communication channel according to a timing of said discrete phasor component, and to determine the ToA of said first message based on said symbol boundary and said path delay.

20. The wireless communication system of claim 19, wherein said ToA has an error of no more than 1 nanosecond.

21. The wireless communication system of claim 19, wherein the wireless communication device is configured to determine said path delay by applying a super-resolution frequency-estimation algorithm to convert said channel estimation from a frequency domain into a time domain.

22. The wireless communication system of claim 19 wherein the wireless communication device is configured to determine a time-of-flight (ToF) between a receiver of said signal and a transmitter of said signal based on the ToA of said signal.

23. A product including a non-transitory storage medium having stored thereon instructions that, when executed by a machine, result in:
calculating a time of arrival (ToA) of a wireless communication signal received over a wireless communication channel based on a channel estimation of said wireless communication channel and a detected symbol boundary of a symbol of said wireless communication signal, calculating the ToA of said wireless communication signal comprises:
identifying a discrete phase vector (phasor) component of said channel estimation in a frequency domain;
determining a path delay corresponding to said wireless communication channel according to a timing of said discrete phasor component; and determining the ToA of said wireless communication signal based on said symbol boundary and said path delay.

24. The product of claim 23, wherein determining said path delay comprises performing an eigen decomposition on a covariance matrix corresponding to said channel estimation.

25. The product of claim 23, wherein detecting said symbol boundary comprises detecting a ToA of said symbol.

* * * * *